United States Patent [19]
Pushaw

[11] Patent Number: 5,955,188
[45] Date of Patent: Sep. 21, 1999

[54] SKIVED FOAM ARTICLE CONTAINING ENERGY ABSORBING PHASE CHANGE MATERIAL

[75] Inventor: Robert J. Pushaw, Havertown, Pa.

[73] Assignees: Outlast Technologies, Inc., Boulder, Colo.; R.H. Wyner Associates, Inc., West Bridgewater, Mass.

[21] Appl. No.: 09/165,583

[22] Filed: Oct. 2, 1998

Related U.S. Application Data

[60] Division of application No. 08/843,397, Apr. 15, 1997, Pat. No. 5,851,338, which is a continuation-in-part of application No. 08/606,487, Mar. 4, 1996, Pat. No. 5,677,048.

[51] Int. Cl.⁶ .................................................... B32B 05/16
[52] U.S. Cl. ..................... 428/320.2; 428/321.1; 428/323; 428/327; 442/315
[58] Field of Search ............................ 428/320.2, 321.1, 428/323, 327; 442/315

[56] References Cited

U.S. PATENT DOCUMENTS

| | | |
|---|---|---|
| 3,852,401 | 12/1974 | Suzuki et al. . |
| 4,003,426 | 1/1977 | Best et al. . |
| 4,446,917 | 5/1984 | Hayes . |
| 4,504,402 | 3/1985 | Chen et al. . |
| 4,531,511 | 7/1985 | Hochberg . |
| 4,572,884 | 2/1986 | Benson et al. . |
| 4,581,285 | 4/1986 | Mahefkey, Jr. . |
| 4,587,279 | 5/1986 | Salyer et al. . |
| 4,612,239 | 9/1986 | Dimanshteyn et al. . |
| 4,617,332 | 10/1986 | Salyen et al. . |
| 4,645,613 | 2/1987 | Harvey et al. . |
| 4,711,813 | 12/1987 | Salyer . |
| 4,747,240 | 5/1988 | Voisinet et al. . |
| 4,756,968 | 7/1988 | Bryant et al. . |
| 4,774,133 | 9/1988 | Doree . |
| 4,797,160 | 1/1989 | Salyer . |
| 4,825,939 | 5/1989 | Salyer et al. . |
| 4,856,294 | 8/1989 | Scaringe et al. . |
| 5,053,446 | 10/1991 | Salyer . |
| 5,069,358 | 12/1991 | Avery, Jr. . |
| 5,106,520 | 4/1992 | Salyer . |
| 5,211,949 | 5/1993 | Salyer . |
| 5,254,380 | 10/1993 | Salyer . |
| 5,282,994 | 2/1994 | Salyer . |
| 5,290,904 | 3/1994 | Colvin et al. . |
| 5,499,460 | 3/1996 | Bryant et al. . |

FOREIGN PATENT DOCUMENTS

WO 93/24241  12/1993  WIPO .

*Primary Examiner*—Helen L. Pezzuto
*Attorney, Agent, or Firm*—Carol W. Burton, Esq.; Holland & Hart LLP

[57] ABSTRACT

A composition for saturation of preformed, previously cured foam substrates having an at least partially open cell configuration, includes a polymer binder in which microspheres containing a phase change material are dispersed. Preferred phase change materials include paraffinic hydrocarbons. The microspheres may be microencapsulated. A preferred cured foam substrate is a skived polyurethane or polyether foam of from 20 to 1000 mils in thickness, preferably 20 to 200 mils in thickness, having up to 6 ounces per square yard or more of encapsulated phase change material embedded in a polymer binder. One method of applying the binder with dispersed encapsulated phase change materials is by applying a binder/microsphere dispersion to the upper surface of a previously cured foam sheet with, then drawing a vacuum from the underside of the cured foam sheet to permeate from 20% to 100% of the cured foam sheet with the binder/microsphere dispersion. The resulting product is then cured. An alternative method of applying the binder with embedded encapsulated phase change materials using knife over roll technique to an exposed surface of the skived foam is disclosed in which the most preferred viscosity of the uncured polymer binder is from 7,000 to 9,000 centipoise.

7 Claims, 2 Drawing Sheets

SKIVED FOAM ARTICLE CONTAINING ENERGY ABSORBING PHASE CHANGE MATERIAL

RELATED APPLICATIONS

The present application is a divisional of U.S. patent application Ser. No. 08/843,397, filed Apr. 15, 1997, now U.S. Pat. No. 5,851,338, which is a continuation-in-part of U.S. patent application Ser. No. 08/606,487 filed Mar. 4, 1996 for COATED SKIVED FOAM AND FABRIC ARTICLE CONTAINING ENERGY ABSORBING PHASE CHANGE MATERIAL, now U.S. Pat. No. 5,677,048, and contains subject matter which is related to the subject matter of U.S. patent application Ser. No. 08/477,824 filed Jun. 7, 1995, pending, and to U.S. patent Ser. No. 08/259,964 filed Jun. 14, 1994, now abandoned, both of which are entitled "FABRIC COATING CONTAINING ENERGY ABSORBING PHASE CHANGE MATERIAL AND METHOD OF MANUFACTURING SAME", all of which are assigned to the assignees of the present invention.

FIELD OF THE INVENTION

This invention relates to substrates containing energy absorbing, temperature stabilizing phase change materials and methods of manufacturing same. More particularly, this invention relates to porous substrates treated with microspheres containing phase change material dispersed in a binder and methods of manufacturing same.

BACKGROUND OF THE INVENTION

Recently, microencapsulated phase change materials have been described as a suitable component for substrate coatings when exceptional heat transfer and storage capabilities are desired. In particular, U.S. Pat. No. 5,290,904 for "Fabric with Reversible Enhanced Thermal Properties" to Colvin, et al. teaches that substrates coated with a binder containing microcapsules filled with energy absorbing phase change material enables the substrate to exhibit extended or enhanced heat retention or storage properties.

Research has demonstrated that applying a binder containing microspheres of phase change materials with commercial coating equipment can be problematic. It has been found to be especially difficult to maintain the durability, moisture vapor permeability, elasticity, flexibility, softness and weight of coated substrates when the coating is loaded with a sufficiently high content of encapsulated phase change material. More particularly, when an acrylic compound is used as a binder in which microencapsulated phase change material is disbursed is applied to a fabric and cured, subsequent product durability may suffer. The finished product may be susceptible to cracking or flaking. Deeper penetration of the coating compound into the base substrate may be attempted in an effort to minimize cracking and flaking. While durability of the resulting product may be satisfactory, the final product may be unacceptably stiff.

Coatings of encapsulated phase change materials embedded in acrylic binders on elastic substrates are also problematical because elasticity of the finished product is compromised, and stretching of the coating can result in flaking of the coating. While substituting a latex binder for the acrylic binder alleviates some of the elasticity loss and flaking experienced with acrylic binders on elastic substrates, loading of the latex binder with a decreased amount to encapsulated phase change material may be required. To compensate and apply the desired amount of encapsulated phase change material, an increased amount of latex binder may be applied. However, this solution tends to reduce the flexibility expected to be achieved with a latex binder. The thicker latex coating may also have the effect of reducing moisture permeability and increasing tackiness of the finished product.

It is against this background that the significant improvements and advancement of the present invention have taken place in the field of substrate coatings containing energy absorbing, temperature stabilizing phase change materials and methods of manufacturing same.

OBJECTS OF THE INVENTION

It is the principal object of the present invention to provide an improved dispersion composition containing phase change material of a density sufficient to effect or control heat and energy transfer across a substrate to which the dispersion is applied.

It is another object of the present invention to provide a dispersion of the foregoing character which will maintain substantially all of the breathability, flexibility or other principal qualities of the substrate to which it is applied.

It is a still further object of the present invention to provide permeated substrates having the aforementioned qualities which are durable, resistant to heat, moisture and laundering, without degradation to or loss of the phase change material.

It is still another object of the present invention to provide an improved method of applying compositions containing phase change materials and having the aforementioned qualities to substrates by utilizing commercially available equipment.

It is still another object of the present invention to develop a formulation and method suitable for application of a binder and phase change material composition to extensible substrates.

SUMMARY OF THE INVENTION

The present invention comprises dispersions containing non-ballooning encapsulated phase change material for permeation in previously cured, cross-linked foamed substrates, and methods of manufacturing a cured product in which a cured polymer binder/microsphere dispersion permeates from 20% to 100% of a previously cured, cross-linked, foam sheet. Preferably, the foam sheet is a skived foam sheet, although other foam sheets, for example, cast foam sheets, may be used. A preferred dispersion includes microspheres containing a phase change material dispersed throughout an acrylic binder and applied to a skived polyurethane foam. Preferred phase change materials include paraffinic hydrocarbons. A skived polyurethane foam substrate of from 20 mils to 1000 mils in thickness may be used, with 90 to 200 mils preferred. Polyether and polyester urethanes are preferred skived foams.

A preferred method of applying a polymer binder/microsphere dispersion to an exposed surface of a previously cured, cross-linked foam using knife over roll technique is disclosed. Another preferred application method utilizes reverse roll coating technique. Depending on the coating technique employed, the uncured polymer binder used to coat the cured foam has a viscosity of from 500 to 50,000 centipoise. A preferred viscosity when using knife-over-roll coating techniques is from approximately 7,000 to approximately 9,000 centipoise.

Another preferred method of applying a polymer binder/microsphere dispersion to an exposed surface of a previously cured, cross-linked foam utilizes reverse roll coating techniques to top coat an exposed surface of the foam. A vacuum is then drawn from the opposed lower surface of the cured foam to draw down the dispersion into the cured foam, permeating to a depth of from 20% to 100% of the thickness of the cured foam, most preferably from 30% to 60% of its thickness. The permeated foam is then cured at from 200° F. to 500° F., preferably 300° F. to 400° F., most preferably 325° F. to 375° F., to produce a fully cured product.

Further processing the fully cured product of the present invention results in a product which has special utility as a headliner attached to the underside of the roof of a passenger compartment of an automobile, truck or other vehicle. In the preferred headliners of the present invention, a sheet, for example, a brushed nylon fabric sheet, is attached with adhesive to one surface of the foregoing fully cured foam. The opposing surface is flame bonded to an adhesive film, which is then attached to the underside of the roof of a vehicle. The fabric sheet thus faces downward into the passenger compartment, affording the vehicle's occupants an aesthetically pleasing ceiling surface. The headliner contributes to the control of thermal conductivity into and from the passenger compartment, thereby maintaining the desired temperature established by the vehicle's air conditioning and heating equipment and improving passenger comfort. Because the phase change materials in the headliner controllably delay the warming and/or cooling of the passenger compartment air otherwise caused by ambient conditions, demands on the vehicle's air conditioning and heating equipment are decreased, with fuel efficiency increased accordingly.

DETAILED DESCRIPTION OF THE INVENTION

Figure 1:
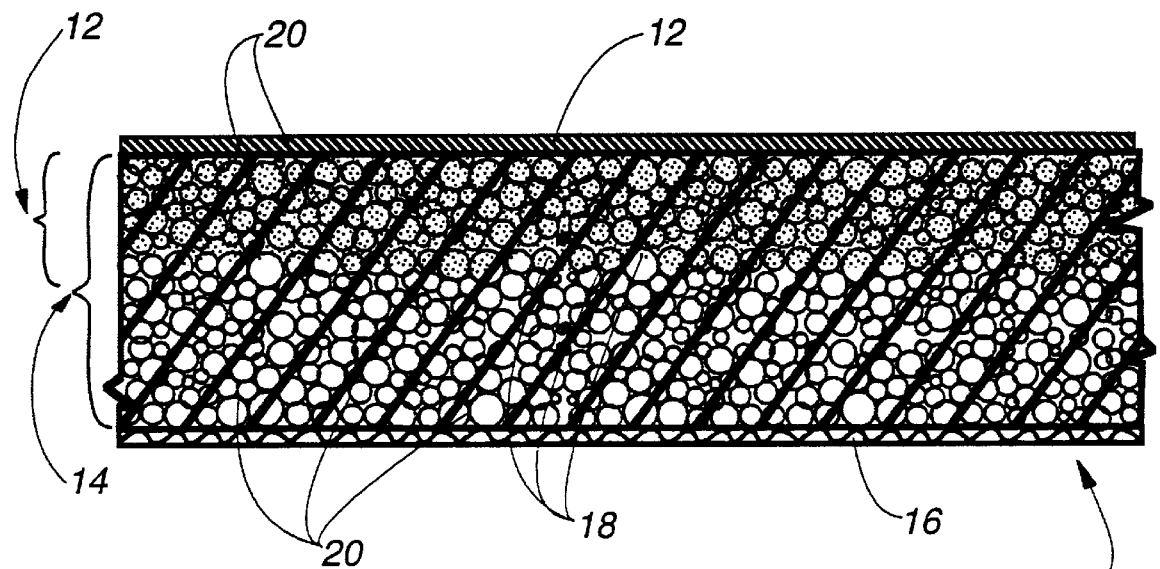
FIG. 1 is a section view of the article of the present invention, in which a polymer binder containing non-ballooning microencapsulated phase change materials is permeated in the open celled structure of a skived foam substrate, which is in turn attached to a fabric substrate.

In accordance with the present application, it has been discovered that permeating a previously cured, cross-linked skived foam substrate with a polymer binder in which microspheres of phase change materials are dispersed, results in a finished product in which the structural integrity of the skived foam provides a supporting matrix for a binder/microsphere dispersion. It has been further discovered that attaching a sheet, for example a fabric or film sheet, to at least one side of the skived foam substrate results in a finished product in which structural integrity of the skived foam substrate is maximized. The finished products of the present invention manifest a high level of loading of the encapsulated phase change materials, thereby providing exceptional control of thermal conductivity across the coated, skived foam substrate.

The polymer binder used with the present invention may be in the form of a solution, dispersion or emulsion in water or in organic solvent. The polymer binder may initially be polymeric, or in the form of monomers and/or oligomer, or low molecular weight polymers which upon drying and/or curing are converted to their final molecular weight and structure. These binders are preferably film-forming, elastomeric, and have a glass transition temperature in the range of −45° C. to +45° C., depending upon the desired application.

The polymers may be linear or branched. Copolymers may be random, block or radial. The polymers may have pendant reactive groups, reactive ends or other crosslinking mechanisms, or be capable of entanglement and/or hydrogen bonding in order to increase the toughness of the finished coating and/or its resistance to heat, moisture, solvents, laundering, dry-cleaning or other chemicals.

Suitable monomers include, but are not limited to, acrylic esters (preferably alkyl-acrylate and methacrylates containing 4 to 17 carbon atoms); styrene; isoprene; acrylonitrile; butadiene; vinyl acetate; vinyl chloride; vinyidiene chloride; ethylene; butylene; propylene; chloroprene; etc. Polymers and copolymers based upon the above monomers and/or upon silicone; epoxy; polyurethane; fluorocarbons; chlorosulfonated polyethylene; chlorinated polyethylene; and other halogenated polyolefins are also useful.

A preferred polymer binder is made with a dispersed polymer latex is an anionic, heat reactive, acrylic latex containing 59% non-volatiles in water, such as the acrylic polymer latex marketed under the trade name Hycar XT9202™ and available from B. F. Goodrich Chemical Company of Cleveland, Ohio. The polymer latex has a glass transition temperature of −25° C. When properly dried and cured, substrate coatings made from polymer latex such as Hycar XT9202™ are washable and dry-cleanable.

The coating compositions of the present invention preferably include from 30 to 500 parts by dry weight of microspheres for each 100 parts by dry weight of acrylic polymer latex. The coating compositions preferably include from 0.005% to 6% dry weight each of surfactant and dispersant to dry weight of microspheres. Water is added to total 25% to 80% of the final wet coating composition. An antifoam agent of from 0% to 1% dry weight to total weight of the final wet coating composition is preferred. The most preferred ratios of components of the coating composition of the present invention are: 70 to 300 parts by dry weight of microspheres for each 100 parts by dry weight of acrylic polymer latex, 0.1% to 1% dry weight each of surfactant and dispersant to dry weight of microspheres, water totaling 40% to 60% of the final wet coating composition and antifoam agent of from 0.1% to 0.5% dry weight to total weight of the final wet coating composition.

An alternative method utilizes microspheres of phase change material which are not completely dried during the manufacturing process. Wet microspheres containing from about 25% to about 65% by weight water are preferred and can be readily handled. When using such microspheres, a surfactant and a dispersant are added to a polymer binder dispersion before the wetted microspheres are dispersed therein. DOS and Strodex PK90™ are preferably mixed with the polymer binder dispersion before the wet microspheres are mixed with and dispersed therein.

Generally speaking, phase change materials have the capability of absorbing or releasing thermal energy to reduce or eliminate heat transfer at the temperature stabilizing range of the particular temperature stabilizing material. The phase change material inhibits or stop the flow of thermal energy through the coating during the time the phase change material is absorbing or releasing heat, typically during the material's change of phase. This action is transient, i.e., it will be effective as a barrier to thermal energy until the total latent heat of the temperature stabilizing material is absorbed or released during the heating or cooling process. Thermal energy may be stored or removed from the phase change material, and can effectively be recharged by a source of heat or cold. By selecting an appropriate phase change material, a substrate can be coated for use in a particular application where the stabilization of temperatures is desired. Two or more different phase change materials can be used to address particular temperature ranges and such materials can be mixed.

Paraffinic hydrocarbon phase change materials suitable for use in the dispersions of the present invention are shown in Table I, with the number of carbon atoms in such materials directly related to the respective melting point.

TABLE I

| COMPOUND | NO. CARBON ATOMS | MELTING POINT °C. |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | -5.5 |

Phase change materials such as the listed paraffinic hydrocarbons are preferably formed into microspheres and encapsulated in a single or multi-layer shell of gelatin or other material. Encapsulated microsphere diameters of 1 to 100 microns are preferred, most preferably from 10 to 60 microns. Microspheres may also be bound in a silica matrix of sub-micron diameters. Microspheres containing n-octadecane or n-eicosane are suitable for clothing. Such microspheres are available from MacGill Enterprises, Inc. of West Milton, Ohio and Microtek Laboratories, Inc. of Dayton, Ohio.

EXAMPLE I

A preferred coating formulation for application to a skived polyurethane foam 90 mils thick, is prepared as shown in Table II

TABLE II

| COMPONENT | Wt % | DIRECTIONS |
|---|---|---|
| Microsphere Dispersion: | | |
| Water | 35.00 | |
| 75% DOS | 0.40 | |
| Strodex PK90 (90% NV) | 0.20 | |
| K18 microspheres (dry) | 36.50 | |
| Acrysol ASE60 (28% NV) | 1.00 | Mix, dispersing ingredients well. |
| AF9020 (20% NV) | 0.05 | Mix slowly with dispersed ingredients until foam dissipates. |
| Ammonium hydroxide (28%) | 0.50 | Add slowly to the defoamed dispersion, with good mixing. Let stand 6 hours. Remix |

TABLE II-continued

| COMPONENT | Wt % | DIRECTIONS |
|---|---|---|
| | | immediately before use. |
| Polymer Binder Dispersion: | | |
| Hycar XT9202 latex polymer | 21.35 | |
| 75% DOS | 0.20 | |
| Strodex PK90 | 0.10 | |
| Acrysol ASE60 (28% NV) | 3.40 | |
| Hercules Advantage 831 | 0.30 | Mix ingredients slowly until foam dissipates. |
| COATING: | | |
| Ammonium Hydroxide | 1.00 | Slowly add Microsphere Dispersion to Polymer Binder Dispersion; add ammonium hydroxide slowly with good mixing thereto. |

A coated substrate is produced using the coating like that of Example I and a conventional polyester urethane skived foam 90 mils in thickness bonded to a tricot, open mesh fabric. Using a knife-over-roll coating head configuration, an acceptable dry weight of 2.5 ounces of encapsulated phase change material per square yard of skived foam was obtained after curing. In this configuration, distribution and penetration of encapsulated phase change material into the open cell configuration of the skived foam was less than 50% of the thickness of the skived foam.

To obtain increased loading of the microencapsulated phase change material and increased permeation of into the open celled structure of the skived foam to greater than 50% of the thickness of the skived foam, it has been discovered that decreasing viscosity of the uncured polymer binder to from approximately 3,000 centipoise to approximately 15,000 centipoise is desired. A viscosity of from approximately 6,000 centipoise to approximately 10,000 centipoise is preferred, with a most preferred viscosity of from approximately 7,000 centipoise to approximately 9,000 centipoise.

EXAMPLE II

A most preferred coating formulation where high phase change material content and substantial extensibility is required, for example a skived polyester foam 90 mils thick, is prepared as shown in Table III.

TABLE III

| COMPONENT | Wt % | DIRECTIONS |
|---|---|---|
| Water | 6.70 | |
| 75% DOS | 0.43 | Dissolve in water. |
| Strodex PK90 (90% NV) | 0.23 | Dissolve in water. |
| ACRYNOL 35D | 48.00 | Add to water solution and mix. |
| K18 microspheres (dry) | 41.03 | Add slowly to ACRYNOL mixture. |
| AF9020 (20% NV) | 0.07 | Mix slowly with dispersed ingredients until foam dissipates. |
| Hercules Advantage 831 | 0.09 | Mix ingredients slowly until foam dissipates. |
| Acrysol ASE60 (28% NV) | 2.71 | Mix slowly, dispersing ingredients well. |
| Ammonium hydroxide (28%) | 0.74 | Add slowly to the defoamed dispersion, with good mixing. |

The coating of Example II used to manufacture a coated fabric-backed skived foam of the present invention preferably has a pH of from 8.5 to 9.6, and a percent solids of from 48.5% to 50.5%. A viscosity of the uncured polymer dispersion is acceptable in the range of approximately 500 to approximately 50,000 centipoise, with a viscosity of from approximately 6,000 to approximately 10,000 centipoise preferred, and a viscosity of from approximately 7,000 to approximately 9,000 centipoise most preferred.

Referring now to FIG. 1, a permeated substrate 10 is produced using the coating 12 like that of Example II and a conventional polyester urethane skived foam 14 which is preferably 90 mils in thickness bonded to a tricot, open mesh fabric 16. Using a knife-over-roll coating head configuration, a excellent dry weight of 3.4 ounces of encapsulated phase change material 18 per square yard of skived foam 14 was obtained after curing. In this configuration, distribution and penetration of encapsulated phase change material into the open cells 20 of the skived foam 14 was at or greater than 50% of the thickness of the skived foam 14.

In the configuration just described, the microencapsulated phase change materials were selected to have an effective phase change range of approximately 79° F. to approximately 83° F. This phase change temperature was selected because of its capability to provide a cooling sensation when the cured and coated skived foam fabric article comes in contact with a person's skin. Such a configuration is useful as a shoe liner in athletic shoes.

In another configuration, PBNII™, an embossed Cerex™ sheet, is bonded to one surface of a 50 mil thick polyurethane skived foam sheet. The opposing surface of the polyurethane skived foam sheet is coated with the uncured polymer binder containing encapsulated phase change materials as described above in Example II and Table III, to obtain a dry weight of phase change material, after curing, of approximately 4.4 ounces per square yard of skived foam.

To achieve a treated skived foam suitable for use in applications where higher moisture vapor transmission rates are desired but water is repelled, a polyurethane film approximately 30 mils thick is bonded to one surface of a 50 mil thick polyurethane skived foam sheet. The opposing surface of the polyurethane skived foam sheet is coated with the uncured polymer binder containing encapsulated phase change materials as described above in Example II and Table III, to obtain a dry weight of phase change material, after curing, of approximately 6.0 ounces per square yard of skived foam.

Figure 2:
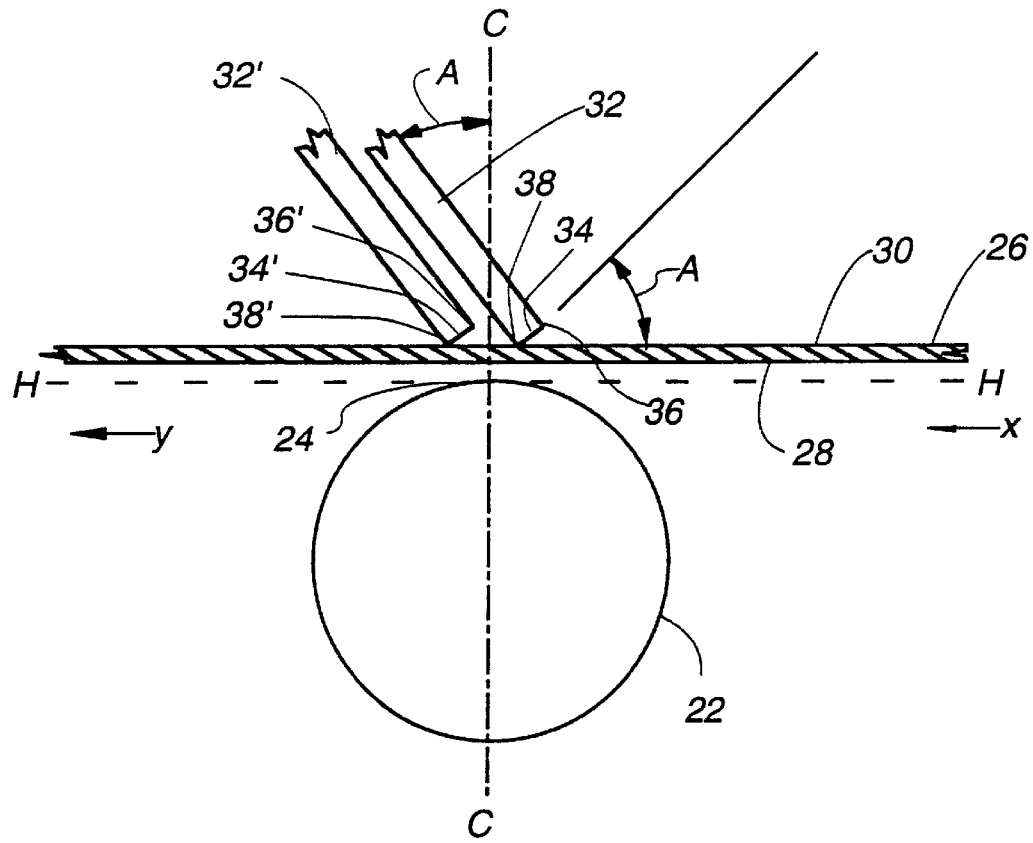
FIG. 2 is a section view knife and roll configuration with which the coating method of the present invention may be practiced to manufacture the coated article shown in FIG. 1.

In order to achieve a coated article of the present invention in which the polymer binder/microencapsulated phase change material dispersion is dispersed into the skived foam to a depth of from 20% to 50% or more of the thickness of the skived foam, an improved knife-over-roll configuration technique was developed which roved to be especially effective to force the dispersion into the open cell structure of the skived foam. Referring now to FIG. 2, a roll 22 has a centerline "C—C" which is substantially perpendicular to a horizontal plane "H—H" tangential to an upwardly facing surface 24 of the roll 22. A fabric-backed skived foam substrate 26 is passed in a direction from position "X" to position "Y" over the roll 22, substantially in alignment with the plane H—H, with an exposed fabric surface 28 of the fabric-backed skived foam substrate 26 facing substantially downward and an exposed skived foam surface 30 facing substantially upward. A knife 32 or 32' is positioned over the roll 22. The knife 32 or 32' has an approximately 3" wide flat leading blade 34 or 34' having a leading edge 36 or 36' and a trailing edge 38 or 38'. Preferably, the knife 32 is positioned over the roll 22 with either its trailing edge 38 positioned approximately 3" in front of the centerline C—C or the knife 32' if positioned with its leading edge 36' approximately 3" behind the centerline C—C. The knife is positioned at an angle "A" approximately 5° to 35°, preferably 10° to 15°, and most preferably 11° to 13° back away from the centerline C—C, making the edge 34 or 34' approximately the same angle A off of the horizontal plane H—H with which the substate to be coated is aligned. A polymer binder/microencapsulated phase change dispersion having a preferred viscosity of approximately 7,000 to approximately 9,000 centipoise is applied to the exposed surface skived foam surface 30 of the fabric-backed skived foam substrate 26 with the knife-over-roll configuration just described, to produce a coated skived foam fabric-back article after curing using conventional techniques.

Figure 3:
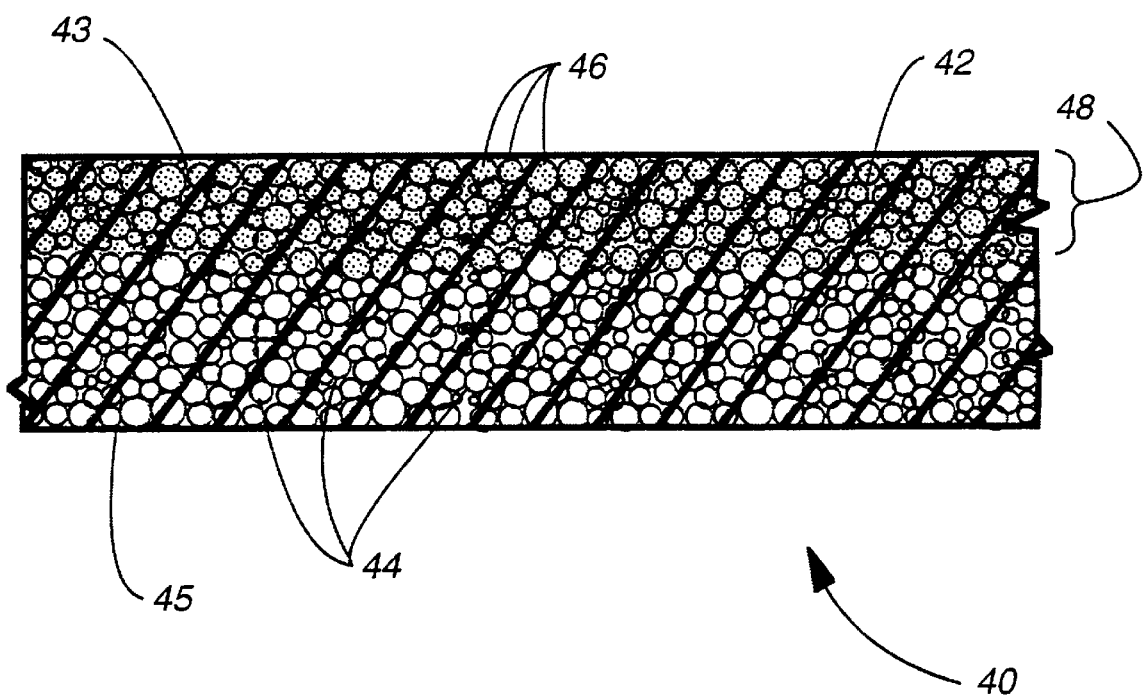
FIG. 3 is a section view of a previously cured, cross-linked skived foam substrate in which a cured binder/microsphere dispersion has permeated approximately 30% of the skived foam substrate.

Referring now to FIG. 3, a partially permeated article 40 is shown which is another preferred embodiment of the present invention. Article 40 includes a previously cured, cross-linked, skived foam substrate 42 having an open cell 44 configuration. An exposed surface 43 of the foam substrate 42 is treated with a polymer binder dispersion 48 containing encapsulated phase change materials 46 dispersed throughout. A vacuum is drawn on the dispersion 48 from the opposing surface 45 of the skived foam sheet 42. The binder/microsphere dispersion 48 permeates from 20% to 100%, preferably 30% to 60%, and most preferably approximately 30% of the skived foam sheet 42. The permeated foam is then preferably subjected to curing at a temperature of most preferably 325° to 375° F. for one minute or more to produce the finished permeated skived foam article 40. It will be understood by those of skill in the art, that lower and higher curing temperatures may be employed, provided the during time is lengthened or shortened, accordingly. In this way, curing temperatures of from 200° to 500° F. may be employed, although 300° to 400° F. is more preferred. In any case, upon cooling, the skived foam article 40 permeated with the cured binder/microsphere dispersion 48, may be rolled for use or further treatment.

The previously cured, cross-linked, skived foam substrate 42 may be a cured polyether foam, which is preferred due to its resistance to high humidity. However, polyester, polyethylene and polyvinyl foams may also be used. In addition, foams which are cast are also acceptable, provided they have an least partially open cell configuration, it being understood that the term "open cell configuration" is intended to encompass cured foams having an at least partially open cell configuration. A skived foam substrate 42 having a thickness of approximately 160 mils is suitable, although a thickness of from 20 to 1000 mils or more may be used. Preferably, the exposed surface 43 of the skived foam substrate 42 to be treated is the top surface, which allows for top coating with the binder/microsphere dispersion 48.

When permeating a cured foam with the binder/microsphere dispersion 48 using the foregoing technique, the binder is preferably an acrylic binder having a relatively low viscosity. Although a viscosity of from 500 to 4,000 centipoise is acceptable for the binder, a viscosity of approximately 1,000 to 1,500 centipoise is more preferred, with a viscosity of approximately 1,000 most preferred. It is noted that while binders having a viscosity of greater than 1,000 centipoise may be used, dilution of the binder may be necessary. Upon to dilution, the microspheres may tend to fall of the dispersion. This tendency is counteracted by continuously agitating the dispersion prior to treating the cured foam substrate. Agitation of the dispersion prior to coating following by coating using a reverse-roll coater has proven successful, although other treatment techniques, for example, knife over roll and screen coating are contemplated.

One preferred use of the skived foam article 40 of the present invention is as a headliner attached to the interior roof of a passenger compartment of an automobile, truck or other vehicle. In one embodiment of such a headliner, a skived foam article 40 permeated to a depth of approximately 30% to 60% with a binder/microsphere dispersion 48 and cured, has treated surface a 43 and an opposing surface 45. A precast polyamide adhesive or other suitable adhesive (not shown) is applied to the treated surface 43 and simultaneously a brushed nylon fabric sheet (not shown) is placed over the polyamide adhesive. Heat and pressure are applied with a roller, thereby bonding the brushed nylon fabric sheet to the permeated foam article 40. When cooled, the resulting product is suitable for use as a headliner, after attaching to the opposing surface 45 to the interior of the roof of a vehicle, using conventional techniques.

In an alternative embodiment, a 1½ mil sheet of Dow 899A modified polyethylene adhesive film is flame bonded to the opposing surface 45. The headliner is subsequently attached to the interior of the roof of a vehicle by flame bonding. Although the modified polytheylene adhesive film is used, it will be understood that other continuous and discontinuous adhesive films may be used. Exemplary adhesive films includes polyamide, polyester and polyurethane films. Furthermore, other methods of bonding the adhesive sheet to the impregnated foam are contemplated. For example, hot roll processes and hot melt processes may be used. Other adhesives, for example, spray adhesives, may be used.

Presently preferred embodiments of the present invention and many of its improvements have been described with a degree of particularity. It should be understood that this description has been made by way of preferred examples, and that the invention is defined by the scope of the following claims.

What is claimed is:

1. A treated article, comprising:

a polymer binder;

a plurality of microspheres containing a phase change material and dispersed throughout said binder to produce a binder/microsphere dispersion; and a previously cured foam substrate having opposed first and second surfaces and an open cell configuration, wherein said binder/microsphere dispersion permeates from 20% to 100% of said cured foam substrate.

2. The article of claim 1 wherein said phase change material is a paraffinic hydrocarbon.

3. The article of claim 2 wherein said substrate is a skived foam.

4. The article of claim 3 wherein said binder comprises a latex material.

5. The article of claim 3 wherein said skived foam substrate is from 90 mils to 200 mils in thickness and said dispersion permeates from 30% to 60% of said skived foam subtrate.

6. The article of claim 1 wherein said foam substrate is from 90 mils to 1000 mils in thickness and said dispersion permeates from 30% to 60% of said foam subtrate.

7. A headliner for a vehicle, said headliner comprising:

a polymer binder;

a plurality of microspheres containing a paraffinic hydrocarbon phase change material and dispersed throughout said binder to produce a binder/microsphere dispersion;

a previously cured, cross-linked foam sheet having opposed first and second surfaces and an open cell configuration, wherein said binder/microsphere dispersion permeates from 20% to 100% of said foam sheet; and a sheet attached to said first surface of said foam sheet producing a headliner thereby, wherein said sheet is attached to said first surface of said foam sheet after permeation of said foam sheet by binder/microsphere dispersion and after curing of said binder/microsphere dispersion and said headliner is attached to an underside of a roof of a vehicle with said sheet exposed to view by an occupant in the vehicle.

* * * * *